Oct. 19, 1926.

J. A. CHAMBERS

LOADING AND UNLOADING MACHINE

Filed Dec. 30, 1925 — 2 Sheets-Sheet 1

J. A. Chambers, Inventor

Oct. 19, 1926.　　　　　　　　　　　　　　　　1,603,838
J. A. CHAMBERS
LOADING AND UNLOADING MACHINE
Filed Dec. 30, 1925　　2 Sheets-Sheet 2
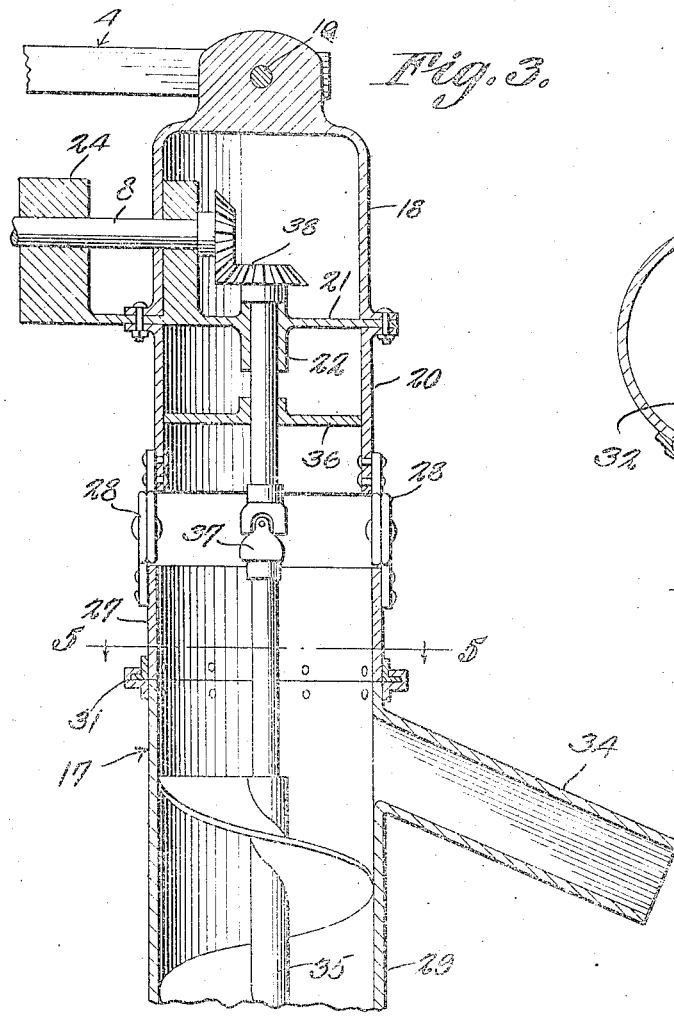
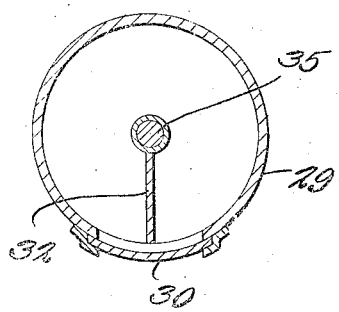
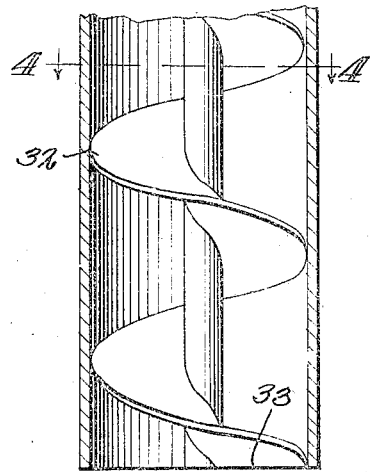
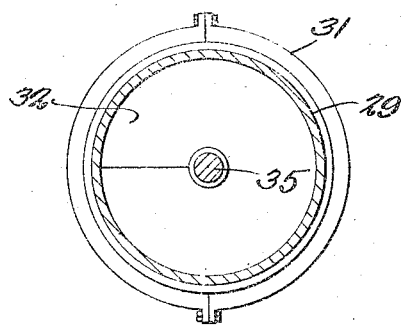
J. A. Chambers
Inventor.
By ____ & Co.
Attorneys.

Patented Oct. 19, 1926.

1,603,838

UNITED STATES PATENT OFFICE.

JAMES A. CHAMBERS, OF LAKELAND, FLORIDA.

LOADING AND UNLOADING MACHINE.

Application filed December 30, 1925. Serial No. 78,447.

This invention aims to provide a simple but efficient means for unloading loose material from open-top railway cars and like vehicles.

It is within the province of the disclosure to improve generally, and to enhance the utility of, devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 3 is a longitudinal section of the conduit;

Figure 4 is a cross section on the line 4—4 of Figure 3;

Figure 5 is a cross section on the line 5—5 of Figure 3.

Figure 1:
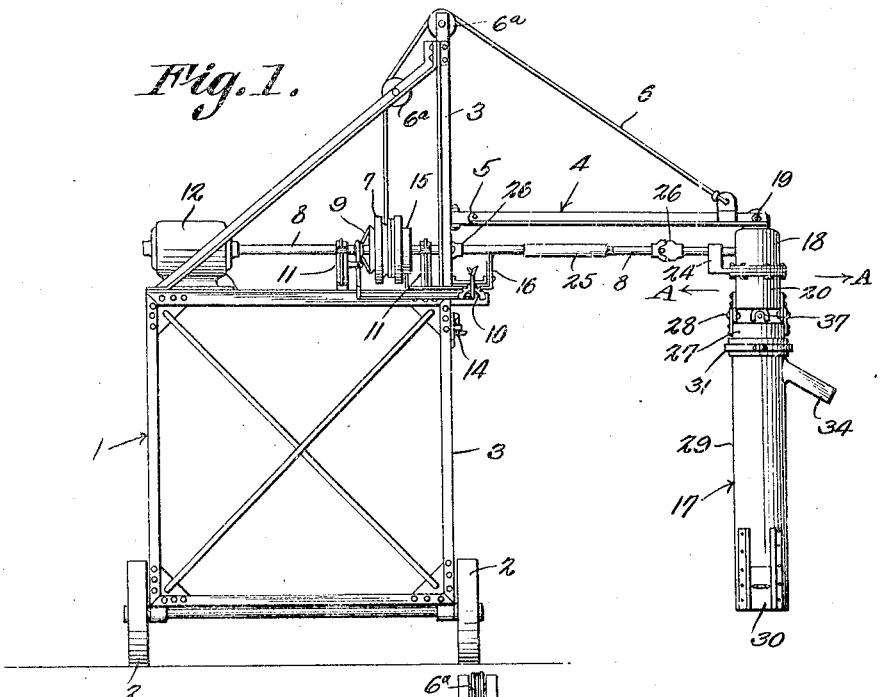
Figure 1 shows in end elevation, a device constructed in accordance with the invention.
Figure 2:
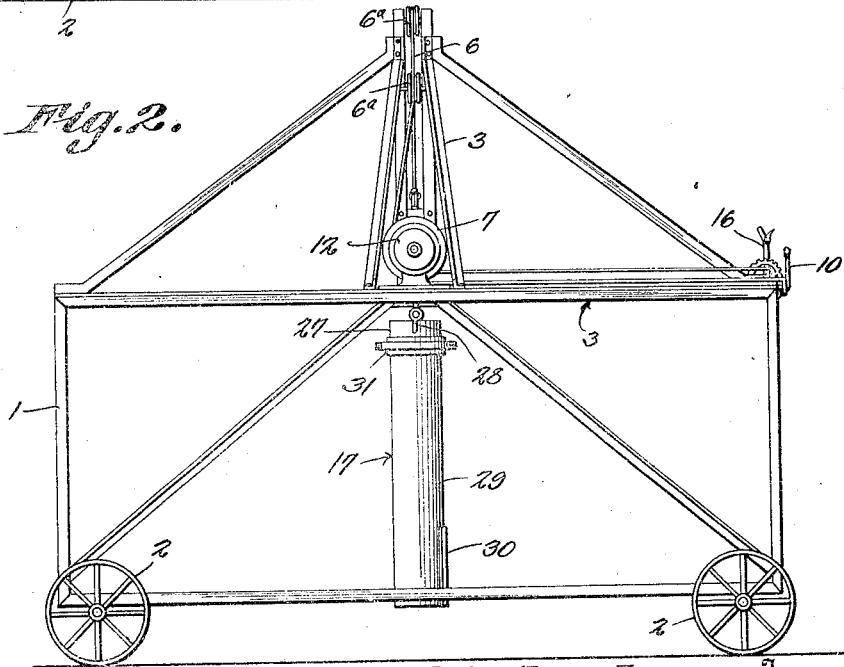
Figure 2 is a side elevation.

The machine forming the subject matter of this application comprises a support, which may be in the form of a truck 1 carried by wheels 2, so that the truck can be moved along conveniently from car to car, which is to be unloaded. On the top of the truck 1 there is an upstanding frame 3. An outwardly prolonged boom 4 is pivoted at 5 to the truck 1 for swinging movement. The boom 4 is provided at its outer end with a means for handling the material, and in order that the aforesaid means may be raised and lowered, as the work may demand, and in order that the said means may be swung upwardly and backwardly into an out-of-the-way position, when not in use, a flexible element 6 is connected to the outer end of the boom 4 and is rove over idlers 6ᵃ on the frame 3. From the idlers 6ᵃ the flexible element 6 is extended downwardly and is wound about a drum 7.

The drum 7 is rotatable on a shaft 8, but is adapted to be connected thereto by a clutch 9, the operating mechanism 10 for which extends to the forward side of the truck 1, so that it may be manipulated conveniently by an operator. The shaft 8 is journaled in the bearings 11 on the top of the truck 1. Any kind of a prime mover may be provided for rotating the shaft 8, but it may be convenient to rotate the shaft through the instrumentality of an electric motor 12 on the truck 1, a switch 14 being mounted on the forward side of the truck 1, so that the operator can reach the switch readily, the switch 14 being interposed in the circuit of the motor 12. The rotation of the shaft 8 is under the governance of a brake 15, the operating mechanism 16 of which extends to the forward side of the truck, so that an operator, without shifting his position, may not only handle the operating mechanism 16 for the brake 15, but, as well, can manipulate the switch 14 to start and stop the motor 12, and, also, handle the operating mechanism 10 for the clutch 9.

The material is received within, and is carried upwardly through, a substantially vertical conduit 17, shown in detail in Figure 3. The conduit 17 is a composite structure and includes an upper tubular member 18 which is pivoted at 19 to the outer end of the boom 4, to swing in the direction of the arrows A in Figure 1. The conduit 17 includes an intermediate tubular member 20. The members 20 and 18 of the conduit have outstanding flanges, between which a transverse partition 21 is bolted or secured otherwise. The partition 21 extends outwardly to the rear of the conduit 17, as clearly shown in Figures 1 and 3. The partition 21 has a central bearing 22 disposed in the axis of the conduit 17. The partition 21 carries, also, an upstanding bearing 23, and this bearing is located within the conduit 17, near the inner wall of the tubular member 18, as Figure 3 will show. The external end of the partition 21 is supplied with an upstanding bearing 24. The shaft 8 is journaled, not only in the bearings 11, but, as well, in the bearings 24 and 23, and extends into the member 18 of the conduit 17. There may be a slip joint 25 in the shaft 8. This slip joint enables the shaft 8 to shorten and lengthen a little, as the conduit 17 is swung in the direction of the arrows A in Figure 1. The slip joint 25, moreover, facilitates the operation which consists in swinging the boom 4 and the conduit 17 upwardly or downwardly, by means of the flexible element 6, or its equivalent. The shaft 8 should be flexible, in order that the boom 4 may be swung upwardly and downwardly, and, having this consideration in mind, universal joints 26 are interposed in the shaft 8, on opposite sides of the slip joint 25.

Continuing the description of the conduit 17, it will be observed that the same includes an intermediate member 27, of tubular form, located below the intermediate member 20. The parts 27 and 20 are connected in any suitable way for relative swinging movement, for instance by pivotally connected eye bolts 28, the construction being such that the tubular member 27 and parts therebeneath and connected therewith, may be swung in a direction about at right angles to that indicated by the arrows A in Figure 1. Noting the pivotal connection afforded at 19, together with the connection supplied at 28, it will be obvious that the conduit 17 has, practically, a universal swinging movement, so that the lower end of the conduit may be shifted into any desired position with respect to the material which is to be elevated. The conduit 17 includes a lower tubular member 29. In the lower end of the lower tubular member 29, at one side thereof, there is an opening which is controlled by a vertically slidable door 30. The lower tubular member 29 of the conduit 17 is rotatably connected at 31 to the intermediate tubular member 27, and the result is that, if it is not convenient to draw up the material vertically through the lower end of the conduit 17, the operator can open the sliding door 30, rotate the lower tubular member 29 of the conduit 17 on a vertical axis, swing the conduit laterally, as desired, and permit the material to pass into the conduit, at the lower end thereof, laterally, when the door 30 is opened.

The means for elevating the material within the conduit 17 may be of any desired form, but a screw conveyor 32 may be used, the lower end 33 of the screw conveyor being so fashioned that it can dig into the material and loosen it. The material, having been elevated within the conduit 17 by the screw conveyor 32, is discharged through a laterally projecting spout 34 on the member 29 of the conduit, and the rotatable connection shown at 31 enables the position of the spout 34 to be changed, circumferentially of the axis of the conduit 17. The screw conveyor 32 is carried by a shaft 35 located in the conduit 17 and journaled in the bearing 22, and in a bearing plate 36 mounted in the intermediate member 20 of the conduit 17. A universal joint 37 is interposed in the shaft 35, so that the lower part of the conduit 17 can be swung laterally on the connection shown at 28. The upper end of the shaft 35 is operatively connected with the shaft 8, in any suitable way, for instance by beveled pinions 38.

The operation of the device has been dealt with hereinbefore, step by step, and the description of the operation, at this point, may be dismissed somewhat briefly. The motor 12, or its equivalent, under the control of the switch 14, rotates the shaft 8. By means of the operating mechanism shown at 10, and the clutch 9, the drum 7 may be coupled to the shaft 8. The drum 7 then is rotated, and the flexible element 6 raises or lowers the boom 4, with the conduit 17, thus adapting the intake or elevating mechanism for the material, to the work in hand, and enabling the conduit 17 to be lowered into a railroad car or the like, and be raised out of the car. The rotation of the shaft 8 may be controlled by the brake 15 and the operating mechanism 16. The shaft 8 rotates the shaft 35 by way of the beveled pinions 38, the screw conveyor 32 elevates the material in the conduit 17, and the material is passed out of the railroad car or other vehicle by way of the spout 34.

What is claimed is:—

1. In a device of the class described, a support, an outstanding boom pivoted to the support, a depending conduit comprising an upper member, an intermediate member, and a lower member open at its bottom and provided at its lower end with a slidable side closure, the lower member having a lateral outlet, means for mounting the upper member on the boom for swinging movement, means for connecting the upper and intermediate members for relative swinging movement, means for connecting the intermediate and lower members for relative axial rotation, a conveyor operating in the conduit to discharge material through the outlet, means for swinging the boom, and means for operating the conveyor.

2. In a device of the class described, a support, an outstanding boom pivoted to the support, a depending flexible conduit pivoted to the boom, said conduit comprising cooperating members, and having an outlet, a partition held between said members of the conduit and comprising an end located outside of the conduit, a first bearing on the partition, within the conduit, a second bearing on said end of the partition and located outside of the conduit, a first shaft journaled in the first bearing, a second shaft journaled in the second bearing, means for connecting the shafts operatively, a worm conveyor carried by the first shaft, and cooperating with the outlet, means on the support for driving the second shaft, and means for swinging the boom.

3. In a device of the class described, a support, an outstanding boom pivoted to the support, a depending conduit pivoted to the boom, a conveyor operating in the conduit, a flexible shaft journaled on the support and on the conduit, means for connecting the shaft with the conveyor, a drum on the shaft, a clutch connecting the drum with the shaft, a flexible element connected to the boom and to the drum, and means for guiding the intermediate portion of the flexible element.

4. In a device of the class described, a wheel-mounted truck, an outstanding boom pivotally mounted on the truck, a depending conduit carried by the boom, a conveyor operating in the conduit, a shaft journaled on the truck and on the conduit, means for connecting the shaft with the conveyor, means for driving the shaft, and means operated by the shaft for swinging the boom and the conduit vertically, to effect a raising and lowering of the conduit.

In testimony that I claim the foregoing as my own, I have hereto affixed my signature.

JAMES A. CHAMBERS.